United States Patent
Liu et al.

(10) Patent No.: US 11,429,312 B1
(45) Date of Patent: Aug. 30, 2022

(54) MULTIPLEXED STORAGE ACCESSES

(71) Applicant: HEWLETT-PACKARD DEVELOPMENT COMPANY, L.P., Spring, TX (US)

(72) Inventors: Wei Ze Liu, Spring, TX (US); Monji G. Jabori, Spring, TX (US); Rosilet Retnamoni Braduke, Spring, TX (US); Sumit Kumar, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/343,417

(22) Filed: Jun. 9, 2021

(51) Int. Cl.
*G06F 3/06* (2006.01)

(52) U.S. Cl.
CPC .......... *G06F 3/0658* (2013.01); *G06F 3/0604* (2013.01); *G06F 3/0622* (2013.01); *G06F 3/0644* (2013.01); *G06F 3/0652* (2013.01); *G06F 3/0659* (2013.01); *G06F 3/0673* (2013.01)

(58) Field of Classification Search
CPC .... G06F 3/0658; G06F 3/0604; G06F 3/0622; G06F 3/0644; G06F 3/0652; G06F 3/0659; G06F 3/0673
See application file for complete search history.

(56) References Cited

U.S. PATENT DOCUMENTS

| | | | |
|---|---|---|---|
| 9,430,423 B2 | 8/2016 | Yoo et al. | |
| 9,619,175 B2 | 4/2017 | Chung et al. | |
| 10,318,179 B1 | 6/2019 | Er et al. | |
| 2016/0350240 A1 | 12/2016 | Grafton et al. | |
| 2017/0185559 A1 | 6/2017 | Hunsaker et al. | |
| 2021/0342065 A1* | 11/2021 | Chang | G06F 3/0679 |

OTHER PUBLICATIONS

Y. Ou, N. Xiao and M. Lai, "A Scalable Multi-channel Parallel NAND Flash Memory Controller Architecture," 2011 Sixth Annual Chinagrid Conference, 2011, pp. 48-53, doi: 10.1109/ChinaGrid. 2011.29. (Year: 2011).*

* cited by examiner

*Primary Examiner* — Khoa D Doan
(74) *Attorney, Agent, or Firm* — Conley Rose, P.C.

(57) ABSTRACT

In some examples, an electronic device comprises a multiplexer, a first device interface coupled to the multiplexer, a second device interface coupled to the multiplexer, a storage controller coupled to the multiplexer, and a controller coupled to the first device interface. The storage controller is to control a storage device. The controller is to determine a mode based on a command for the controller to access the storage controller and, based on the mode, cause the multiplexer to adjust access of the second device interface to the storage controller.

15 Claims, 5 Drawing Sheets

MULTIPLEXED STORAGE ACCESSES

BACKGROUND

Electronic devices such as desktops, laptops, notebooks, tablets, and smartphones include storage devices such as embedded MultiMedia Cards (eMMCs), Non-Volatile Memory express (NVMe) devices, and Universal Flash Storage (UFS) devices. An electronic device may store data to and retrieve data from its storage device. Such data may include images, or information, to update or to recover machine-readable instructions (e.g., operating system (OS), firmware) that enable the electronic device to operate or other system information (e.g., application versions, identifiers) of the electronic device that secures the electronic device.

BRIEF DESCRIPTION OF THE DRAWINGS

Various examples are described below referring to the following figures.

DETAILED DESCRIPTION

As explained above, storage devices enable electronic devices to store and retrieve images such as an operating system (OS) image, a firmware image, or system data that enable electronic devices to operate securely. The OS image includes machine-readable instructions that enable the electronic device to operate by enabling communications between hardware components (e.g., display devices, storage devices, processors, controllers, device interfaces) of the electronic device and applications (e.g., a set of machine-readable instructions for performing tasks) installed on the electronic device. The firmware image includes machine-readable instructions that enable a hardware component of the electronic device to operate and to communicate with other hardware components or with applications. As described above, the system data image includes application versions, identifiers, and other security data that enable the electronic device to verify a security of an application or a security of the electronic device. The communications may occur utilizing paths, or communication buses. A path may have a device interface that operates according to an associated communication bus standard or specification (e.g., Universal Serial Bus (USB), Serial Peripheral Interface (SPI), Inter-Integrated Circuit (I2C), Improved Inter-Integrated Circuit (I3C), Peripheral Component Interconnect (PCI)).

Periodically, the electronic device may update, or replace, stored images. In some instances, a manufacturer of an application may create a new version of the image (e.g., an updated OS image, an updated firmware image, an updated application version). In some instances, the electronic device may create a backup of the current version of the image (e.g., OS backup, firmware backup, application data backup). In some instances, a user may install new applications, update existing applications, update identifiers, create new identifiers, or backup application data. The stored images secure the electronic device by enabling the electronic device to restore the electronic device to a known state after a failure and by providing system data for verifying the security of applications and stored data.

Updating a stored image may utilize resources (e.g., hardware components, applications) of the electronic device in such a way as to diminish a user experience. In some instances, updating the stored image may interrupt the OS with such frequency that a speed at which an application provides the user experience is decreased. In other instances, updating the stored image may utilize a path to such a degree that a user is unable to utilize other applications that operate along the same path.

This disclosure describes examples of an electronic device including a controller that enables access to a storage controller via a multiplexer. The controller couples to a first device interface in response to a first mode or to a second device interface in response to a second mode. The first device interface may provide a path for data transfer that reduces usage of other resources that impact the user experience. The first device interface may provide an SPI path for the data transfer, thereby leaving a USB path available for other applications to utilize without conflicting with the data transfer. In other examples, the first device interface may provide a path other than SPI (e.g., USB, I2C, I3C, PCI) for the data transfer. In other examples, the second device interface may provide a path other than USB (e.g., SPI, I2C, I3C, PCI). In some examples, as described below with respect to FIG. 1, a command, or signal comprising an instruction, sent from a basic input/output system (BIOS) of the electronic device to the controller indicates the mode. In other examples, a command sent from machine-readable instructions that cause the controller to perform actions herein attributed to the controller indicates the mode. In other examples, a command sent from a processor of the electronic device to the controller indicates the mode. The mode may indicate an action for the storage controller to perform on a storage device. The action may include locking (e.g., disabling access to) or unlocking (e.g., enabling access to) the storage device, writing data to the storage device, reading data from the storage device, or erasing data from the storage device. The mode may also indicate which controller or processor of the electronic device is accessing the storage device. The mode may also indicate a partition of the storage device for writing/reading/erasing. In some examples, the controller secures the storage controller by determining whether the mode is permitted by a security setting (e.g., password protected, locked, restricted/limited access) before executing the action indicated by the mode.

In particular, in response to the first mode, which may indicate that an OS image or a firmware image is to be written to the storage device, the electronic device may enable the first device interface to provide access to the storage device. In some examples, the electronic device may also disable access of the second device interface to the storage device. In response to the second mode, which may indicate that data other than the OS image or the firmware image is to be written to the storage device, the electronic device may enable the second device interface to provide access to the storage device. In some examples, the electronic device may prevent the second device interface from accessing a partition of the storage device that includes the OS image, the firmware image, or other system data. In other examples, the electronic device may prevent a third device interface from accessing the storage device while the second device interface is enabled.

By adjusting the path for data transfer, the user experience is improved because resources remain available for use by other applications during writing of the OS image or the firmware image to the storage device. In some examples, by including a multiplexer to enable and disable access of a device interface to the storage device, the experience of the user may be further improved by enabling access of a first processor to the storage device without interfering with resources utilized by a second processor. In addition to improving the user experience, the electronic device described herein enables the electronic device to utilize the storage device to store data other than the OS image, the firmware image, and system data. By selecting which device interface may access the storage device, the electronic device may control which areas of the storage device are accessed and by which interface device, providing increased secured storage available for operation.

In an example in accordance with the present disclosure, an electronic device is provided. The electronic device comprises a multiplexer, a first device interface coupled to the multiplexer, a second device interface coupled to the multiplexer, a storage controller coupled to the multiplexer, and a controller coupled to the first device interface. The storage controller is to control a storage device. The controller is to determine a mode based on a command for the controller to access the storage controller and, based on the mode, cause the multiplexer to adjust access of the second device interface to the storage controller.

In another example in accordance with the present disclosure, an electronic device is provided. The electronic device comprises a storage device having multiple partitions, a storage controller to control the storage device, a multiplexer coupled to the storage controller, first and second device interfaces coupled to the multiplexer, a processor coupled to the first device interface, and a controller coupled to the second device interface. The controller is to determine a mode based on a command for the controller to access the storage controller and, based on the mode, cause the multiplexer to enable access of the second device interface to the multiple partitions via the storage controller or to restrict access of the first device interface to a subset of the multiple partitions via the storage controller.

In another example in accordance with the present disclosure, a non-transitory machine-readable medium is provided. The non-transitory machine-readable medium stores machine-readable instructions. When executed by a controller of an electronic device, the machine-readable instructions cause the controller to determine a mode based on a command for the controller to access a storage controller, where the storage controller is to control a storage device having multiple partitions; based on the mode, generate a password; and based on the password, cause a multiplexer to adjust access of the controller and a processor to the storage device via the storage controller.

Figure 1:
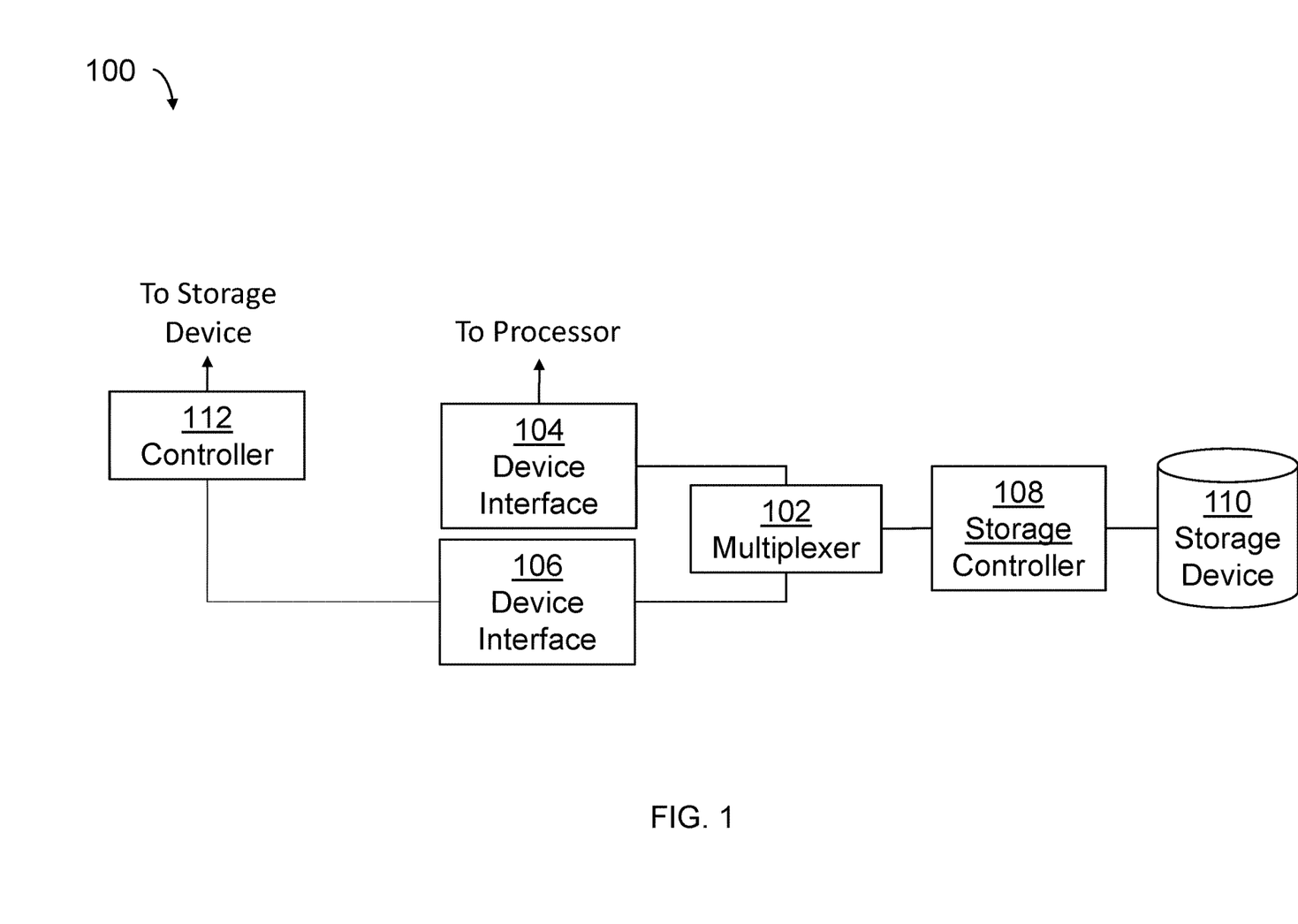
FIG. 1 is a schematic diagram of an electronic device having multiplexed storage access in accordance with various examples.

Referring now to FIG. 1, a schematic diagram of an electronic device 100 having multiplexed storage access is depicted, in accordance with various examples. The electronic device 100 comprises a multiplexer 102, device interfaces 104, 106, a storage controller 108, a storage device 110, and a controller 112. The electronic device 100 may be a desktop, a laptop, a notebook, a tablet, a smartphone, a mobile device, or other electronic computing device having a storage device. The multiplexer 102 may be a switch, a combinational logic circuit, a data selector, or any other suitable hardware component, machine-readable instructions, or a combination of both that enables switching between multiple inputs to generate an output. The device interfaces 104, 106 may be SPI devices, USB devices, I2C devices, I3C devices, PCI devices, other suitable devices based on a communication bus standard or specification, or some combination thereof. The storage controller 108 and the controller 112 may be a microprocessor, a microcomputer, a microcontroller, a programmable integrated circuit, a programmable gate array, or other suitable device for controlling operations of a component or multiple hardware components. The storage device 110 may be flash memory or other suitable memory device. In some examples, the storage controller 108 and the storage device 110 may be an integrated circuit (IC). For example, the storage controller 108 and the storage device 110 may be an eMMC, an NVMe, a UFS, or other suitable memory IC device. In some examples, the controller 112 may be an end point security controller (EpSC) or other suitable controller having a storage device storing machine-readable instructions that enable a security protection for certain system operations of the electronic device 100.

In various examples, the electronic device 100 comprises the multiplexer 102 coupled to the device interfaces 104, 106 and the storage controller 108. The device interface 104 couples to a processor (not explicitly shown). The processor may be a central processing unit (CPU) or a graphics processing unit (GPU) of the electronic device 100. The device interface 106 couples to the controller 112. The storage controller 108 couples to the storage device 110. The controller 112 couples to a storage device (not explicitly shown). The storage device (not explicitly shown) may be a hard drive, a solid-state drive (SSD), flash memory, random access memory (RAM), or other suitable memory device. As described below with respect to FIGS. 3-5, in some examples, the storage device (not explicitly shown) may store machine-readable instructions that, when executed by the controller 112, may cause the controller 112 to perform some or all of the actions attributed herein to the controller 112. In some examples, the controller 112 comprises an embedded processor and an embedded storage device. The embedded storage device of the controller 112 may store machine-readable instructions that, when executed by the controller 112, may cause the embedded processor of the controller 112 to perform some or all of the actions attributed herein to the controller 112.

As described above, the device interfaces 104, 106 facilitate communication of data between hardware components that are coupled to the device interfaces 104, 106. For example, the device interface 104 facilitates communications between the controller 112 and the multiplexer 102, and the device interface 106 facilitates communications between the processor (not explicitly shown) and the multiplexer 102. As described above, the device interfaces 104, 106 may operate in accordance with the SPI specification, the USB standard, the I2C specification, the I3C specification, the PCI standard, or any other suitable communication bus standard or specification that enables data transfers. In some examples, the device interfaces 104, 106 may be controllers for communication buses, where the controllers manage operations of the communication buses. The device interfaces 104, 106 may be microprocessors, microcomputers, microcontrollers, programmable integrated circuits, programmable gate arrays, or other suitable devices for controlling operations of a communication bus in accordance with a suitable communication bus standard or specification. As described above, in some examples, the device interface 104 may be an SPI controller and the device interface 106 may be a USB controller. In other examples, the device interfaces 104, 106 may be device controllers for other and different types of communication bus standards or specifications. The device interface 104 may be a USB controller and the device interface 106 may be an I3C controller. In other examples, the device interfaces 104, 106 may be device controllers for a same type of communication bus standard or specification. The device interfaces 104, 106 may be USB controllers.

In various examples, the controller 112 responds to commands received from a basis input/output system (BIOS) of the electronic device 100. As used herein, BIOS refers to hardware or hardware and machine-readable instructions to initialize, control, or operate the electronic device 100 prior to execution of an OS of the electronic device 100. The machine-readable instructions included within the BIOS may be software, firmware, microcode, or other programming that defines or controls functionality or operation of the BIOS. The machine-readable instructions may be stored on the storage device (not explicitly shown) that couples to the controller 112. The BIOS may be implemented using instructions, such as platform firmware of the electronic device 100, executable by the processor (not explicitly shown). The BIOS may initialize, control, or operate hardware components and may load, or boot, the OS of the electronic device 100. In some examples, the BIOS may provide or establish an interface between hardware components of the electronic device 100 and the OS. In some examples, the BIOS may implement the Unified Extensible Firmware Interface (UEFI) specification or another specification or standard for initializing, controlling, or operating the electronic device 100.

In some examples, the controller 112 enables device interfaces 104, 106 to provide access to the storage device 110 via the multiplexer 102 in response to receiving a command that indicates a mode. As described above, the mode indicates an action for the storage controller 108 to perform on the storage device 110. In various examples, in response to receiving a command indicating a first mode, the controller 112 enables access to the storage controller 108 via the multiplexer 102 to the device interface 106, and in response to a second mode, the controller 112 enables access to the storage controller 108 via the multiplexer 102 to the device interface 104. In response to a mode that indicates that an OS image or a firmware image is to be written to the storage device 110 by the controller 112, the controller 112 may enable the device interface 106 to provide access to the storage controller 108 via the multiplexer 102. In some examples, responsive to enabling the device interface 106, the controller 112 may also disable access of the device interface 104 to the storage controller 108 via the multiplexer 102. In another example, in response to a mode that indicates that data other than the OS image or the firmware image is to be written to the storage device 110 by the processor (not explicitly shown), the controller 112 may enable the device interface 104 to provide access to the storage controller 108 via the multiplexer 102. In various examples, in response to a completion of the action indicated by a mode, the controller 112 may disable access of the device interface 104 to the storage controller 108 via the multiplexer 102. After the processor (not explicitly shown) writes data to the storage device 110, the controller 112 may disable access of the device interface 104 to the storage controller 108 via the multiplexer 102.

By utilizing the multiplexer 102 to adjust the path for data transfer based on the mode, the user experience is improved because resources remain available for use by other applications during writing of the OS image or the firmware image to the storage device 110. In addition to improving the user experience, utilizing the multiplexer 102 to adjust the path for data transfer based on the mode enables the electronic device 100 to utilize the storage device 110 to store data other than the OS image, the firmware image, and system data.

Figure 2:
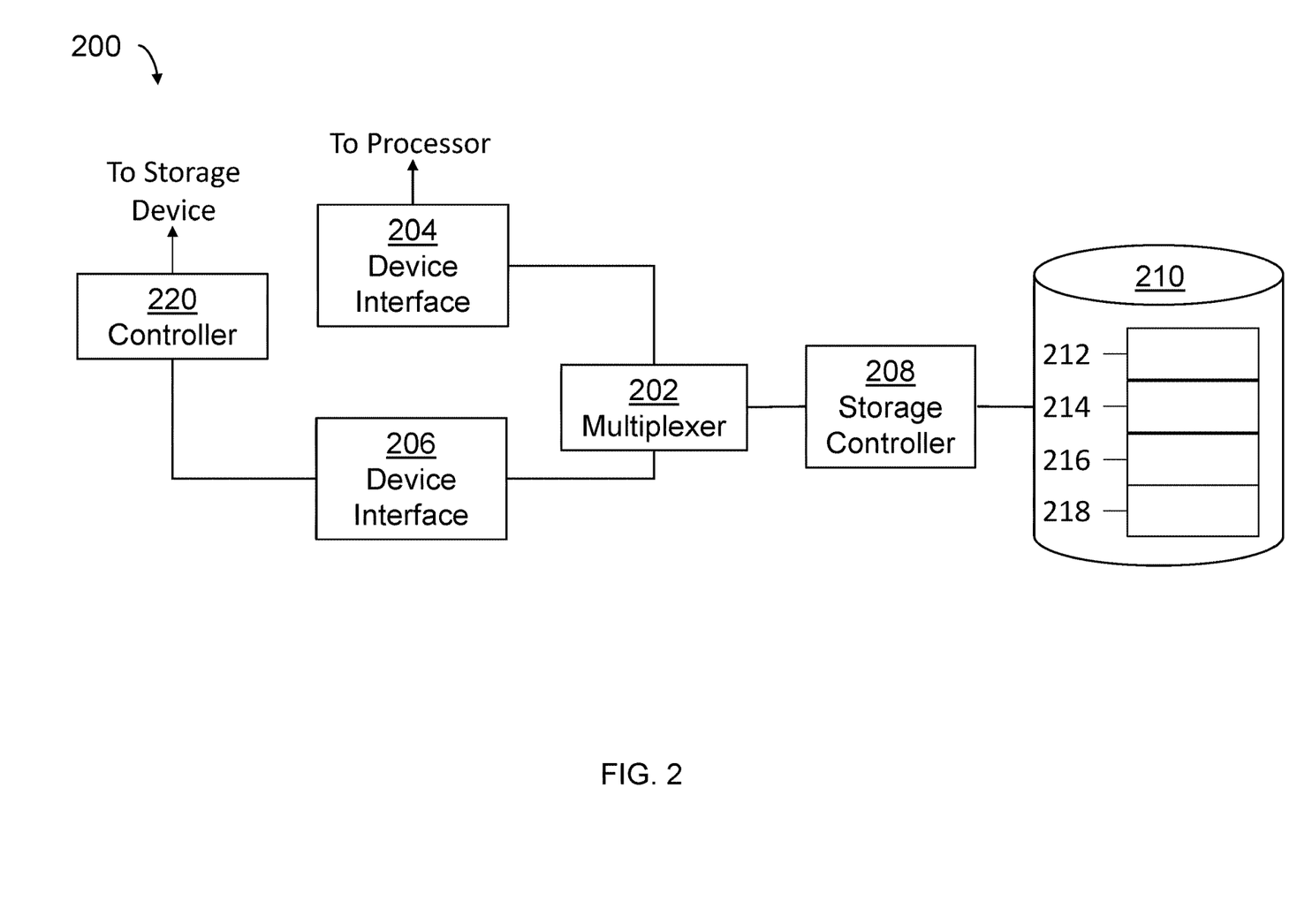
FIG. 2 is a schematic diagram of an electronic device having multiplexed storage access in accordance with various examples.

Referring now to FIG. 2, a schematic diagram of an electronic device 200 having multiplexed storage access is depicted, in accordance with various examples. The electronic device 200 may be the electronic device 100. The electronic device 200 comprises a multiplexer 202, device interfaces 204, 206, a storage controller 208, a storage device 210, and a controller 220. The multiplexer 202 may be the multiplexer 102. The device interfaces 204, 206 may be the device interfaces 104, 106, respectively. The storage controller 208 may be the storage controller 108. The storage device 210 may be the storage device 110. The controller 220 may be the controller 112. The storage device 210 comprises partitions 212, 214, 216, 218.

In various examples, the electronic device 200 comprises the multiplexer 202 coupled to the device interfaces 204, 206 and the storage controller 208. The device interface 204 couples to a processor (not explicitly shown). As described above with respect to FIG. 1, the processor (not explicitly shown) may be a CPU or a GPU of the electronic device 200. The device interface 206 couples to the controller 220. The storage controller 208 couples to the storage device 210. The controller 220 couples to a storage device (not explicitly shown). As described above with respect to FIG. 1, the storage device (not explicitly shown) that couples to the controller 220 may be a hard drive, a solid-state drive (SSD), flash memory, random access memory (RAM), or other suitable memory device. In some examples, as described below with respect to FIGS. 3-5, the storage device (not explicitly shown) may store machine-readable instructions that, when executed by the controller 220, may cause the controller 220 to perform some or all of the actions attributed herein to the controller 220. As described above with respect to FIG. 1, in some examples, the controller 220 comprises an embedded processor and an embedded storage device. The embedded storage device of the controller 220 may store machine-readable instructions that, when executed by the controller 220, may cause the embedded processor of the controller 220 to perform some or all of the actions attributed herein to the controller 220.

In various examples, the controller 220 may enable access of the device interfaces 204, 206 to a partition 212, 214, 216, 218 so that data may be shared between devices coupled to the device interfaces 204, 206. The controller 220 may enable access of the device interface 204 to the partition 218 so that the processor (not explicitly shown) may write data to the partition 218. The controller 220 may then enable access of the device interface 206 to the partition 218 so that the controller 220 may read the data from the partition 218. Enabling access of the controller 220 and the processor (not explicitly shown) to the partition 218 enables data sharing with low impact on resources of the electronic device 200. For example, while the processor (not explicitly shown) writes to the partition 218, the controller 220 may utilize the device interface 206 for other tasks, and while the controller 220 reads the partition 218, the processor (not explicitly shown) may utilize the device interface 204.

As described above, in some examples, in response to receiving a command that indicates a mode, the controller 220 may disable access of a device interface 204, 206 to a partition 212, 214, 216, 218 via the multiplexer 202. For example, an OS image may be stored in the partition 212, a firmware image may be stored in the partition 214, other system data may be stored in the partition 216, and general data may be stored in the partition 218. In another example, the partition 212 may be a boot partition, the partition 214 may be a system data partition, the partition 216 may be a general-purpose partition, and the partition 218 may be a user data partition. The mode may indicate that the processor (not explicitly shown) is to write data to the partition 218. In response to the mode, the controller 220 may enable access of the device interface 204 to the partition 218 and disable access of the device interface 204 to the partitions 212, 214, 216. In some examples, the controller 220 may also disable access of the device interface 206 to the partition 218. By utilizing the multiplexer 202 to disable access of a first device interface to a partition of the storage device 210 during access to the partition by a second device interface, the user experience is improved because restricting access to the partition to one device interface may prevent resource conflicts that may slow or crash the electronic device 200.

In other examples, in response to receiving a command that indicates a mode, the controller 220 determines whether a security setting permits the mode. In response to the security setting preventing the mode, the controller 220 may disable access of a device interface 204, 206 to a partition 212, 214, 216, 218 via the multiplexer 202. For example, the security setting may indicate the storage device 210 is locked. In response to a mode that indicates for the processor (not explicitly shown) to write data to the partition 212, the controller 220 may disable access of the device interface 204 to the partitions 212, 214, 216, 218 via the multiplexer 202. In some examples, in response to the security setting permitting the mode, the controller 220 may enable access of the device interface 204 to the partitions 212, 214, 216, 218 via the multiplexer 202. In other examples, the controller 220 may also disable access of the device interface 204 to the partitions 212, 214, 216, 218 via the multiplexer 202. In another example, the security setting may indicate a device interface 204, 206 does not have access to a partition 212, 214, 216, 218 via the multiplexer 202. For example, the security setting may indicate the processor (not explicitly shown) does not have access to the partition 212 that stores the OS image. In response to a mode indicating for the processor (not explicitly shown) to erase data of the partition 212, the controller 220 may disable access of the device interface 204 to the partition 212. In another example, the security setting may indicate the storage device 210 is write protected. In response to a mode indicating for the controller 220 to write system data to the partition 216, the controller 220 may disable access of the device interface 206 to the partition 216. Utilizing the multiplexer 202 to adjust the path based on a security setting enables the controller 220 to protect data stored on the storage device 210 and to prevent unintended or malicious access of the storage device 210.

Figure 3:
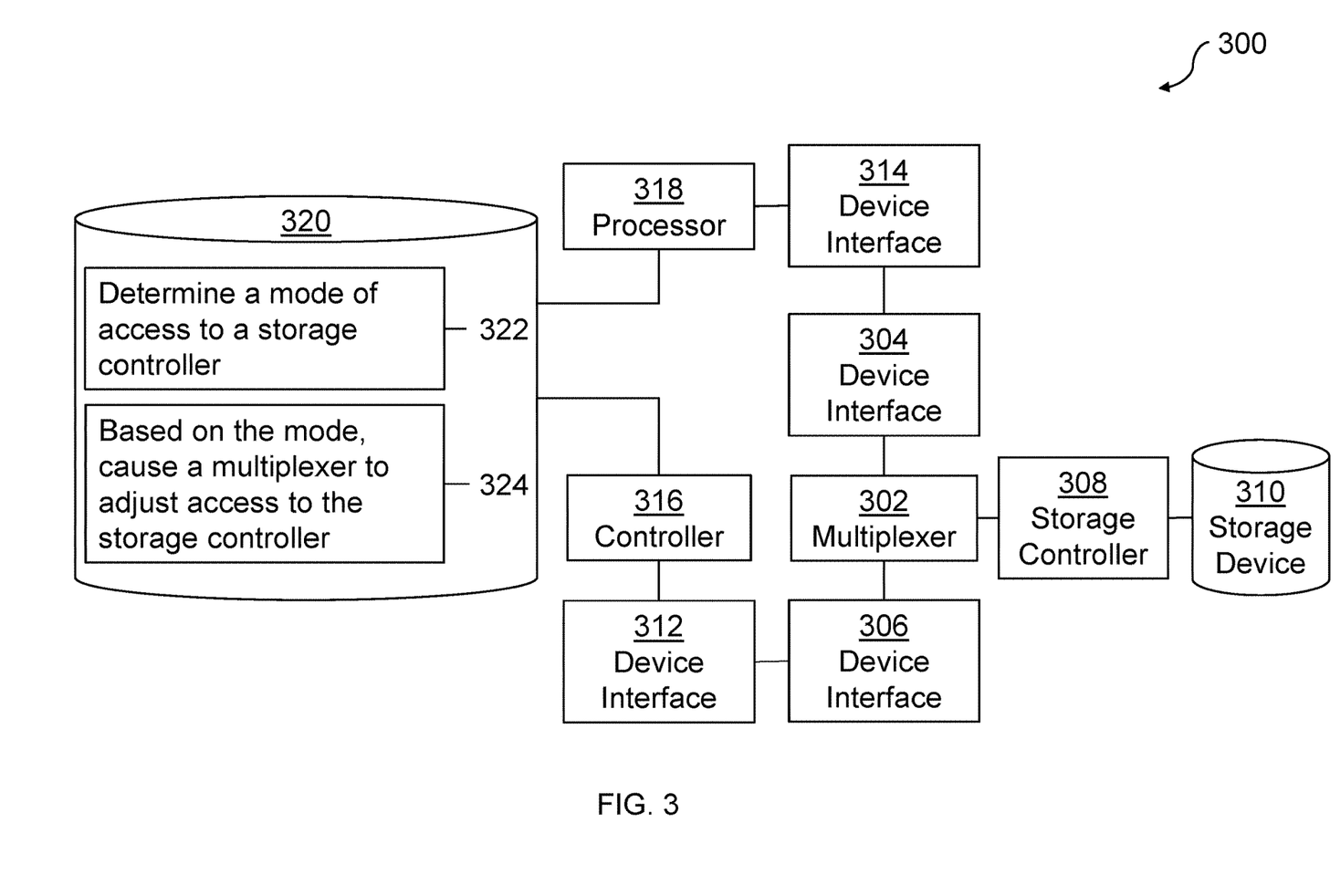
FIG. 3 is a schematic diagram of an electronic device having multiplexed storage access in accordance with various examples.

Referring now to FIG. 3, a schematic diagram of an electronic device 300 having multiplexed storage access is depicted, in accordance with various examples. The electronic device 300 may be the electronic device 100, 200. The electronic device 300 comprises a multiplexer 302, device interfaces 304, 306, 312, 314, a storage controller 308, storage devices 310, 320, a controller 316, and a processor 318. The multiplexer 302 may be the multiplexer 102, 202. The device interfaces 304, 306 may be the device interfaces 204, 206 or the device interfaces 104, 106. In various examples, the device interfaces 312, 314 may be SPI devices, USB devices, I2C devices, I3C devices, PCI devices, other suitable devices based on a communication bus standard or specification, or some combination thereof. In various examples, the device interfaces 312, 314 enable communication between the controller 316 and the processor 318, respectively, and multiple hardware components of the electronic device 300. The storage controller 308 may be the storage controller 108, 208. The storage device 310 may be the storage device 110, 210. The controller 316 may be the controller 112, 220. The processor 318 may be the processor of FIGS. 1-2 (not explicitly shown). As described above with respect to FIGS. 1-2, the processor 318 may be a CPU or a GPU of the electronic device 300. The storage device 320 may be the storage device of FIGS. 1-2 (not explicitly shown). As described above with respect to FIGS. 1-2, the storage device 320 may be a hard drive, a solid-state drive (SSD), flash memory, random access memory (RAM), or other suitable memory device. In various examples, the storage device 320 that couples to the controller 316 may store machine-readable instructions that, when executed by the controller 316, may cause the controller 316 to perform some or all of the actions attributed herein to the controller 316.

In various examples, the electronic device 300 comprises the multiplexer 302 coupled to the device interfaces 304, 306 and the storage controller 308. The device interface 304 couples to the device interface 314. The device interface 306 couples to the device interface 312. The storage controller 308 couples to the storage device 310. The device interface 314 couples to the processor 318. The device interface 312 couples to the controller 316. The controller 316 and the processor 318 couple to the storage device 320. The storage device 320 may store machine-readable instructions. The machine-readable instructions may be the machine-readable instructions 322, 324. The machine-readable instructions 322, 324, when executed by the controller 316, may cause the controller 316 to perform some or all of the actions attributed herein to controller 316.

In various examples, when executed by the controller 316, the machine-readable instructions 322, 324 cause the controller 316 to cause the multiplexer 302 to adjust access of device interfaces 304, 306 to the storage device 310 via the storage controller 308. In some examples, the machine-readable instruction 322 may cause the controller 316 to determine a mode of access to the storage controller 308. In some example, the controller 316 may determine the mode based on a command for the controller 316 to access the storage controller 308. As described above with respect to FIGS. 1-2, the controller 316 may receive the command from the BIOS or the processor 318, for example. The controller 316 may determine the command indicates for the controller 316 to unlock the storage device 310 via the storage controller 308. In some examples, the machine-readable instruction 324 may cause the controller 316 to, based on the mode, cause the multiplexer 302 to adjust access to the storage controller 308. For example, based on the mode indicating for the controller 316 to unlock the storage device 310, the controller 316 may cause the multiplexer 302 to adjust access of the device interface 306 to the storage controller 308 to enable the controller 316 to send the unlock command to the storage controller 308. In some examples, the controller 316 may also cause the multiplexer 302 to adjust access of the device interface 304 to the storage controller 308. For example, the controller 316 may cause the multiplexer 302 to disable access of the device interface 304 to the storage controller 308.

Figure 4:
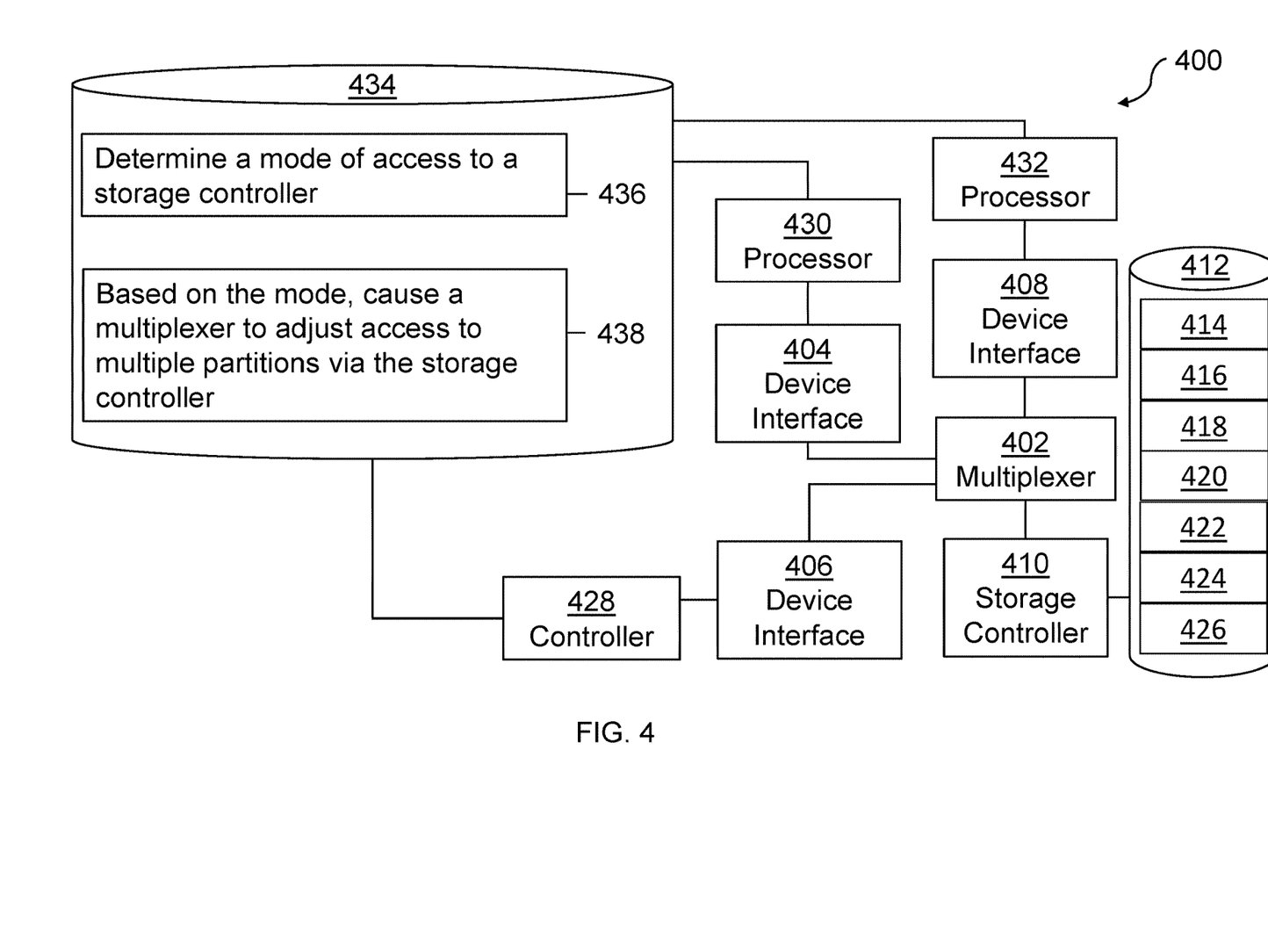
FIG. 4 is a schematic diagram of an electronic device having multiplexed storage access in accordance with various examples.

Referring now to FIG. 4, a schematic diagram of an electronic device 400 having multiplexed storage access is depicted, in accordance with various examples. The electronic device 400 may be the electronic device 100, 200, 300. The electronic device 400 comprises a multiplexer 402, device interfaces 404, 406, 408, a storage controller 410, storage devices 412, 434, a controller 428, and processors 430, 432. The multiplexer 402 may be the multiplexer 102, 202, 302. The device interfaces 404, 406 may be the device interfaces 104, 106, the device interfaces 204, 206, or the device interfaces 304, 306. The storage controller 410 may be the storage controller 108, 208, 308. The storage device 412 may be the storage device 110, 210, 310. The controller 428 may be the controller 112, 220, 316. The processor 430 may be the processor 318. As described above with respect to FIGS. 1-3, the processors 430, 432 may be a CPU or a GPU of the electronic device 400. The storage device 434 may be the storage device 320. As described above with respect to FIGS. 1-3, the storage device 412 may be a hard drive, a solid-state drive (SSD), flash memory, random access memory (RAM), or other suitable memory device. The storage device 412 comprises partitions 414, 416, 418, 420, 422, 424, 426.

In various examples, the electronic device 400 comprises the multiplexer 402 coupled to the device interfaces 404, 406, 408 and the storage controller 410. The device interface 404 couples to processor 430. The device interface 406 couples to the controller 428. The device interface 408 couples to the processor 432. The storage controller 410 couples to the storage device 412. The controller 428 and the processors 430, 432 couple to the storage device 434. The storage device 434 may store machine-readable instructions. The machine-readable instructions may be the machine-readable instructions 436, 438. The machine-readable instructions 436, 438, when executed by the controller 428, may cause the controller 428 to perform some or all of the actions attributed herein to controller 428.

In various examples, when executed by the controller 428, the machine-readable instructions 436, 438 cause the controller 428 to cause the multiplexer 402 to adjust access of device interfaces 404, 406, 408 to the storage device 412 via the storage controller 410. In some examples, the machine-readable instruction 436 may cause the controller 428 to determine a mode of access to the storage controller 410. For example, the controller 428 may determine the mode based on a command for the controller 428 to access the storage controller 410. As described above with respect to FIGS. 1-3, the controller 428 may receive the command from the BIOS or the processors 430, 432, for example. In some examples, the machine-readable instruction 438 may cause the controller 316 to, based on the mode, cause the multiplexer 402 to adjust access to the partitions 414, 416, 418, 420, 422, 424, 426 via the storage controller 410. In various examples, the partition 414 may be a boot partition, the partition 416 may be a system data partition, the partitions 418, 420, 422, 424 may be general-purpose partitions, and the partition 426 may be a user data partition. In an example, based on the mode indicating for the processor 432 to read system data from the partition 416, the controller 428 may cause the multiplexer 402 to enable access of the device interface 406 to the partitions 416, 418, 420, 422, 424, 426 and restrict access of the device interface 404 to the partition 426. In other examples, based on the mode indicating for the processor 432 to read system data, the controller 428 may restrict access of the device interface 404 to partition 426. By including the multiplexer 402 to enable and disable access of the device interfaces 404, 406, 408 to partitions 414, 416, 418, 420, 422, 424, 426 of the storage device 412, the experience of the user may be further improved by enabling access of a first processor (e.g., the processor 430) to the storage device 412 without interfering with resources utilized by a second processor (e.g., the processor 432).

Figure 5:
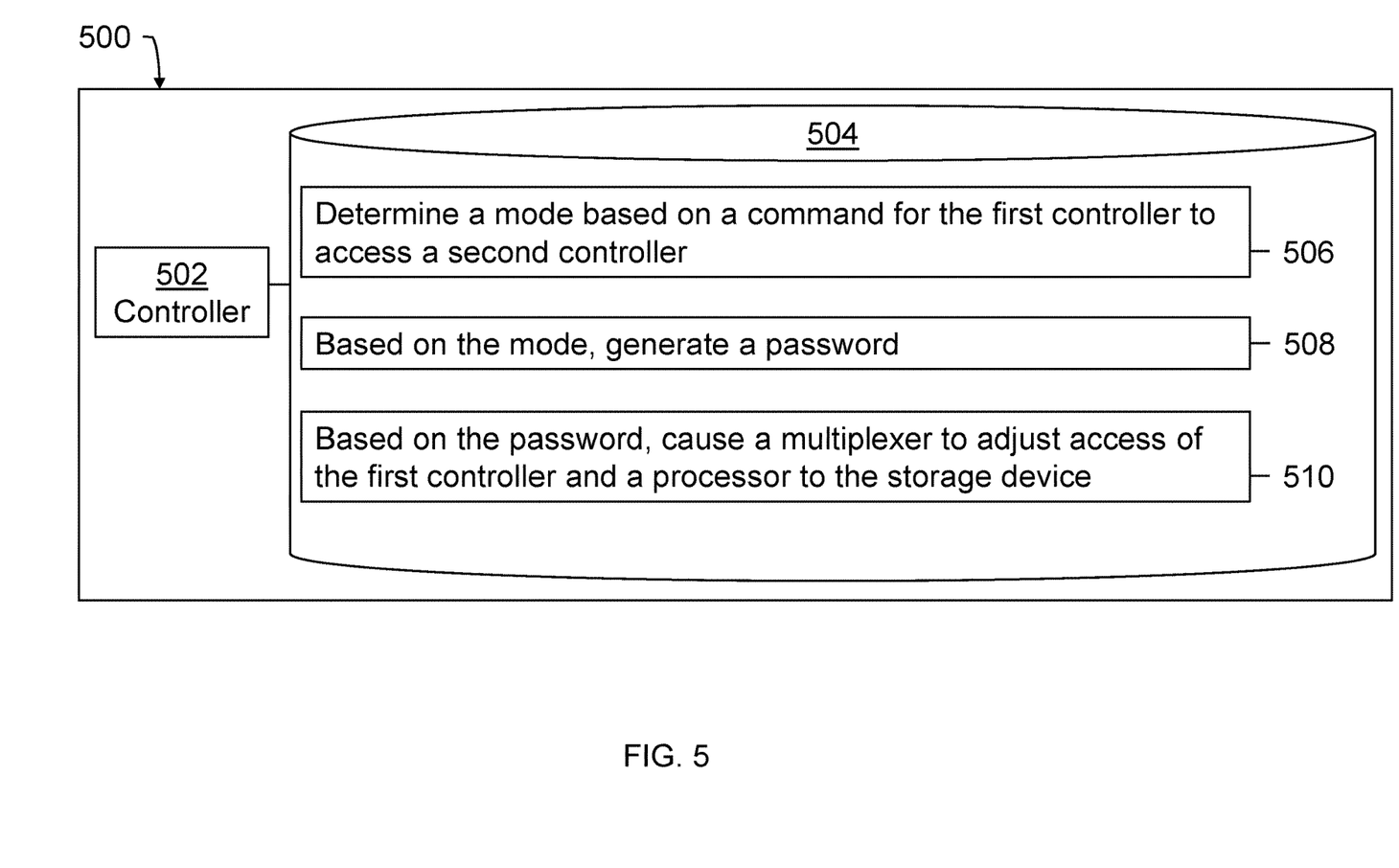
FIG. 5 is a schematic diagram of an electronic device for accessing a multiplexed storage device in accordance with various examples.

Referring now to FIG. 5, a schematic diagram of an electronic device 500 for accessing a multiplexed storage device (not explicitly shown) is depicted, in accordance with various examples. The electronic device 500 may be the electronic device 100, 200, 300, 400. The multiplexed storage device (not explicitly shown) may be the storage device 110, 210, 310, 412. The electronic device 500 comprises a controller 502 and a storage device 504. The controller 502 may be the controller 112, 220, 316, 428. In some examples, the storage device 504 may be the storage device 320, 434. In other examples, the storage device 504 may be an embedded storage device of the controller 502.

In various examples, the electronic device 500 comprises the controller 502 coupled to the storage device 504. The storage device 504 may store machine-readable instructions. The machine-readable instructions may be the machine-readable instructions 506, 508, 510. The machine-readable instructions 506, 508, 510, when executed by the controller 502, may cause the controller 502 to perform some or all of the actions attributed herein to controller 502.

In various examples, when executed by the controller 502, the machine-readable instructions 506, 508, 510 cause the controller 502 to cause a multiplexer (not explicitly shown) to adjust access of the controller 502 and a processor (not explicitly shown) to the multiplexed storage device (not explicitly shown). The multiplexer (not explicitly shown) may be the multiplexer 102, 202, 302, 402. The processor (not explicitly shown) may be the processor 318, 430, 432. In some examples, the machine-readable instruction 506 may cause the controller 502 to determine a mode based on a command for the controller 502 to access a storage controller (not explicitly shown). The storage controller (not explicitly shown) may be the storage controller 108, 208, 308, 410. The storage controller (not explicitly shown) couples to the multiplexed storage device (not explicitly shown). In some examples, the multiplexed storage device (not explicitly shown) may have multiple partitions (e.g., the storage devices 210, 412). As described above with respect to FIGS. 1-4, the controller 502 may receive the command from the BIOS or the processor (not explicitly shown) of the electronic device 500, for example. In an example, the controller 502 may determine the mode based on a command for the controller 502 to access the storage controller (not explicitly shown) for the multiplexed storage device (not explicitly shown) having multiple partitions. In some examples, the machine-readable instruction 508 may cause the controller 502 to, based on the mode, generate a password. In some examples, the machine-readable instruction 510 may cause the controller 502 to, based on the password, cause the multiplexer (not explicitly shown) to adjust access of the controller 502 and the processor (not explicitly shown) to the multiplexed storage device (not explicitly shown) via the storage controller (not explicitly shown).

In various examples, the machine-readable instruction 508 causes the controller 502 to generate a random alphanumeric sequence for the password. In other examples, the machine-readable instruction 508 causes the controller 502 to utilize a key, or a sequence of alphanumeric characters, and a counter device (not explicitly shown) to generate the password. The key may be stored on the storage device 504, for example. In some examples, the controller 502 generates a password based on a password standard or specification of the storage device 504. In various examples, the controller 502 stores the password on the storage device 504.

In various examples, the machine-readable instruction 510 causes the controller 502 to utilize the password to adjust access of the controller 502 and the processor (not explicitly shown) to the multiplexed storage device (not explicitly shown). For example, a mode may be password protected. Password protecting a mode may provide another level of security for the multiplexed storage device (not explicitly shown). For example, a partition of multiple partitions may be password protected to prevent unintended writing, reading, or erasing of data stored on the partition. In some examples, in response to the controller 502 receiving a command comprising a password that does not match a password generated or stored by the controller 502, the controller 502 may cause the multiplexer (not explicitly shown) to restrict access of the controller 502 and the processor (not explicitly shown) to the multiplexed storage device (not explicitly shown) via the storage controller (not explicitly shown).

In other examples, the password may indicate access permissions of the controller 502 and the processor (not explicitly shown). For example, the password may indicate that the controller 502 may access the multiple partitions of the multiplexed storage device (not explicitly shown) and that the processor (not explicitly shown) may access a subset of the multiple partitions. In another example, the password may indicate that the controller 502 may access the multiple partitions of the multiplexed storage device (not explicitly shown), that a first processor (not explicitly shown) of the electronic device 500 may access a first subset of the multiple partitions, and that a second processor (not explicitly shown) of the electronic device 500 may access a second subset of the multiple partitions. In another example, the password may indicate that the controller 502 may access the multiple partitions of the multiplexed storage device (not explicitly shown) and that a first and a second processor (not explicitly shown) of the electronic device 500 may access a subset of the multiple partitions.

The above description is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

In the figures, certain features and components disclosed herein may be shown in exaggerated scale or in somewhat schematic form, and some details of certain elements may not be shown in the interest of clarity and conciseness. In some of the figures, in order to improve clarity and conciseness, a component or an aspect of a component may be omitted.

In the above description and in the claims, the term "comprising" is used in an open-ended fashion, and thus should be interpreted to mean "including, but not limited to . . . ." Also, the term "couple" or "couples" is intended to be broad enough to encompass both direct and indirect connections. Thus, if a first device couples to a second device, that connection may be through a direct connection or through an indirect connection via other devices, components, and connections. Additionally, the word "or" is used in an inclusive manner. For example, "A or B" means any of the following: "A" alone, "B" alone, or both "A" and "B."

What is claimed is:

1. An electronic device, comprising:
   a multiplexer;
   a first device interface coupled to the multiplexer;
   a second device interface coupled to the multiplexer;
   a storage controller coupled to the multiplexer, the storage controller to control a storage device; and
   a controller coupled to the first device interface, the controller to:
     determine a mode based on a command for the controller to access the storage controller; and
     based on the mode, cause the multiplexer to adjust access of the second device interface to the storage controller.

2. The electronic device of claim 1, wherein the mode indicates for the storage controller to lock the storage device, and wherein the multiplexer is to disable access of the second device interface to the storage controller.

3. The electronic device of claim 1, wherein the mode indicates for the controller to write data to the storage device, and wherein the multiplexer is to disable access of the second device interface to the storage controller.

4. The electronic device of claim 1, wherein the mode indicates for a processor coupled to the second device interface to write data to the storage device, and wherein the multiplexer is to enable access of the second device interface to the storage device.

5. The electronic device of claim 4, wherein the mode indicates the processor is to erase data from a first partition of multiple partitions of the storage device, and wherein the multiplexer is to disable access of the second device interface to the first partition of the multiple partitions.

6. An electronic device, comprising:
   a storage device having multiple partitions;
   a storage controller to control the storage device;
   a multiplexer coupled to the storage controller;
   first and second device interfaces coupled to the multiplexer;
   a processor coupled to the first device interface; and
   a controller coupled to the second device interface, the controller to:
     determine a mode based on a command for the controller to access the storage controller; and
     based on the mode, cause the multiplexer to enable access of the second device interface to the multiple partitions via the storage controller or to restrict access of the first device interface to a subset of the multiple partitions via the storage controller.

7. The electronic device of claim 6, wherein the processor is a first processor,
   wherein the electronic device comprises a third device interface coupled to the multiplexer and a second processor, and
   wherein the controller is to, based on the mode, cause the multiplexer to restrict access of the third device interface to the subset of the multiple partitions via the storage controller.

8. The electronic device of claim 7, wherein the multiple partitions comprise a user data partition and a general-purpose partition, and wherein the controller is to restrict access of the first device interface to the general-purpose partition and to restrict access of the third device interface to the user data partition.

9. The electronic device of claim 6, wherein the multiple partitions comprise a boot partition, a system data partition, a general-purpose partition, a user data partition, or a combination thereof.

10. The electronic device of claim 9, wherein the controller is to, based on the mode, cause the multiplexer to restrict access of the first device interface to the boot partition, the system data partition, and the user data partition.

11. A non-transitory machine-readable medium storing machine-readable instructions which, when executed by a controller of an electronic device, cause the controller to:
  determine a mode based on a command for the controller to access a storage controller, the storage controller to control a storage device having multiple partitions;
  based on the mode, generate a password; and
  based on the password, cause a multiplexer to adjust access of the controller and a processor to the storage device via the storage controller.

12. The non-transitory machine-readable medium of claim 11, wherein, based on the password, the multiplexer is to adjust access of the controller to enable the controller access to the multiple partitions and to restrict access of the processor to a subset of the multiple partitions.

13. The non-transitory machine-readable medium of claim 11, wherein the processor is a first processor; and wherein based on the password, the multiplexer is to adjust access of the controller to enable the controller access to the multiple partitions, to restrict access of the first processor to a first subset of the multiple partitions, and to restrict access of a second processor to a second subset of the multiple partitions.

14. The non-transitory machine-readable medium of claim 11, wherein, based on the password, the multiplexer is to disable access of the controller and the processor to the multiple partitions.

15. The non-transitory machine-readable medium of claim 11, wherein the processor is a first processor; and wherein based on the password, the multiplexer is to adjust access of the controller to enable the controller access to the multiple partitions and to restrict access of the first processor and a second processor to a subset of the multiple partitions.

* * * * *